United States Patent
Gaikwad et al.

(10) Patent No.: US 11,429,176 B2
(45) Date of Patent: Aug. 30, 2022

(54) INTELLIGENT AND PREDICTIVE OPTIMIZATION OF POWER NEEDS ACROSS VIRTUALIZED ENVIRONMENTS

(71) Applicant: DELL PRODUCTS L.P., Round Rock, TX (US)

(72) Inventors: Hemant Ramesh Gaikwad, Bangalore (IN); Nishant Yogendrakumar Vijayvergiya, Bangalore (IN)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 15/931,956

(22) Filed: May 14, 2020

(65) Prior Publication Data

US 2021/0357016 A1    Nov. 18, 2021

(51) Int. Cl.
*G06F 1/3209* (2019.01)
*G06F 16/906* (2019.01)
*G06F 1/30* (2006.01)

(52) U.S. Cl.
CPC .............. *G06F 1/3209* (2013.01); *G06F 1/30* (2013.01); *G06F 16/906* (2019.01)

(58) Field of Classification Search
CPC ......... G06F 1/3209; G06F 16/906; G06F 1/30
See application file for complete search history.

(56) References Cited

U.S. PATENT DOCUMENTS

| | | | | |
|---|---|---|---|---|
| 8,429,431 B2* | 4/2013 | Malik | ................... | G06F 1/3209 713/300 |
| 8,595,515 B1* | 11/2013 | Weber | ................... | G06F 1/3206 713/320 |
| 9,250,684 B1* | 2/2016 | Chen | ......................... | G06F 1/26 |
| 10,306,190 B1 | 5/2019 | Schofield et al. | | |
| 10,423,217 B1* | 9/2019 | Bodireddy | ............ | G06F 1/3234 |
| 10,546,324 B2 | 1/2020 | Busch | | |
| 10,565,575 B2 | 2/2020 | Fisher | | |
| 10,572,717 B1 | 2/2020 | Zhu et al. | | |
| 10,603,037 B2 | 3/2020 | Racenet et al. | | |
| 10,620,545 B2 | 4/2020 | Lof et al. | | |
| 10,630,501 B2 | 4/2020 | Ansari et al. | | |
| 10,667,080 B2 | 5/2020 | Phillips et al. | | |
| 10,668,324 B2 | 6/2020 | Case, Jr. et al. | | |
| 10,683,008 B2 | 6/2020 | Pawlicki et al. | | |
| 11,327,549 B2* | 5/2022 | Debata | ...................... | H02J 9/06 |
| 2009/0132840 A1* | 5/2009 | Talwar | ................ | G06F 9/45558 713/340 |
| 2009/0282274 A1* | 11/2009 | Langgood | ............. | G06F 1/3203 713/320 |
| 2010/0205469 A1* | 8/2010 | McCarthy | ............. | G06F 9/5094 713/324 |

(Continued)

*Primary Examiner* — Aurel Prifti
(74) *Attorney, Agent, or Firm* — Jackson Walker LLP; Christopher J. Rourk

(57) ABSTRACT

A system for data processing, comprising a plurality of data center nodes, each data center node having an associated power requirement. A dynamic power capping system operating on a processor and coupled to the plurality of data center nodes, wherein the processor is configured by the dynamic power capping system to implement one or more algorithms that cause the processor to determine a power requirement for each of the plurality of data center nodes and to implement a power setting at each of the plurality of data center nodes that corresponds to the power requirement for the data center node.

20 Claims, 2 Drawing Sheets

(56) References Cited

U.S. PATENT DOCUMENTS

| | | | |
|---|---|---|---|
| 2011/0119514 A1* | 5/2011 | Kim | G06F 1/30 713/340 |
| 2011/0213997 A1* | 9/2011 | Kansal | G06F 1/3234 713/340 |
| 2011/0320832 A1* | 12/2011 | Boss | G06F 1/3209 713/310 |
| 2012/0072745 A1* | 3/2012 | Ahluwalia | G06F 1/26 713/320 |
| 2013/0226362 A1* | 8/2013 | Jagadishprasad | G06F 9/5094 700/297 |
| 2013/0268779 A1* | 10/2013 | Hueston | G06F 1/3206 713/300 |
| 2013/0318371 A1* | 11/2013 | Hormuth | G06F 11/3062 713/320 |
| 2013/0339776 A1* | 12/2013 | Jagadishprasad | G06F 9/5094 713/340 |
| 2014/0067139 A1* | 3/2014 | Berke | G06F 1/26 700/291 |
| 2014/0101475 A1* | 4/2014 | Berke | G06F 1/3206 713/340 |
| 2014/0245031 A1* | 8/2014 | Hamdi | G06F 1/266 713/300 |
| 2015/0177813 A1* | 6/2015 | Bailey | G06F 1/3234 713/320 |
| 2015/0241947 A1* | 8/2015 | Allen-Ware | G06F 1/3206 713/320 |
| 2015/0331477 A1* | 11/2015 | Slik | G06F 1/3209 713/324 |
| 2015/0378406 A1* | 12/2015 | Berghe | G06F 11/3055 713/320 |
| 2015/0378419 A1* | 12/2015 | Berghe | G06F 1/3206 713/320 |
| 2016/0011914 A1* | 1/2016 | Bohn | G06F 1/26 713/300 |
| 2016/0188365 A1* | 6/2016 | Bodas | G06F 9/4881 718/102 |
| 2017/0255240 A1* | 9/2017 | Matteson | G06F 1/3209 |
| 2017/0308137 A1* | 10/2017 | Oliveira | G06F 1/263 |
| 2018/0196490 A1* | 7/2018 | Ail | G06Q 20/308 |
| 2019/0086981 A1* | 3/2019 | Deng | G06F 1/3234 |
| 2019/0332155 A1* | 10/2019 | Humphrey | G06F 1/30 |
| 2020/0042068 A1* | 2/2020 | Rong | G06F 1/3203 |
| 2020/0310886 A1* | 10/2020 | Rajamani | G06F 9/5094 |
| 2020/0394081 A1* | 12/2020 | Manousakis | G06F 1/28 |
| 2021/0037466 A1* | 2/2021 | Silva | H04W 52/0219 |

* cited by examiner

INTELLIGENT AND PREDICTIVE OPTIMIZATION OF POWER NEEDS ACROSS VIRTUALIZED ENVIRONMENTS

TECHNICAL FIELD

The present disclosure relates generally to data processing, and more specifically to an intelligent and predictive optimization of power needs across virtualized environments of different data processing nodes.

BACKGROUND OF THE INVENTION

Data processing centers include a plurality of data processing nodes that have a power requirement. The power requirement is often set at each data processing node, and can only be adjusted manually. As a result, many data processing nodes have the same power requirement setting and do not operate in an efficient manner.

SUMMARY OF THE INVENTION

A system for data processing is disclosed that includes a plurality of data center nodes, where each data center node has an associated power requirement. A dynamic power capping system operating on a processor is coupled to the plurality of data center nodes, and the processor is configured by the dynamic power capping system to implement one or more algorithms that cause the processor to determine a power requirement for each of the plurality of data center nodes and to implement a power setting at each of the plurality of data center nodes that corresponds to the power requirement for the data center node. In this manner, each data processing node can have a customized power requirement.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings may be to scale, but emphasis is placed upon clearly illustrating the principles of the present disclosure. Moreover, in the drawings, like reference numerals designate corresponding parts throughout the several views, and in which.

DETAILED DESCRIPTION OF THE INVENTION

Figure 1:
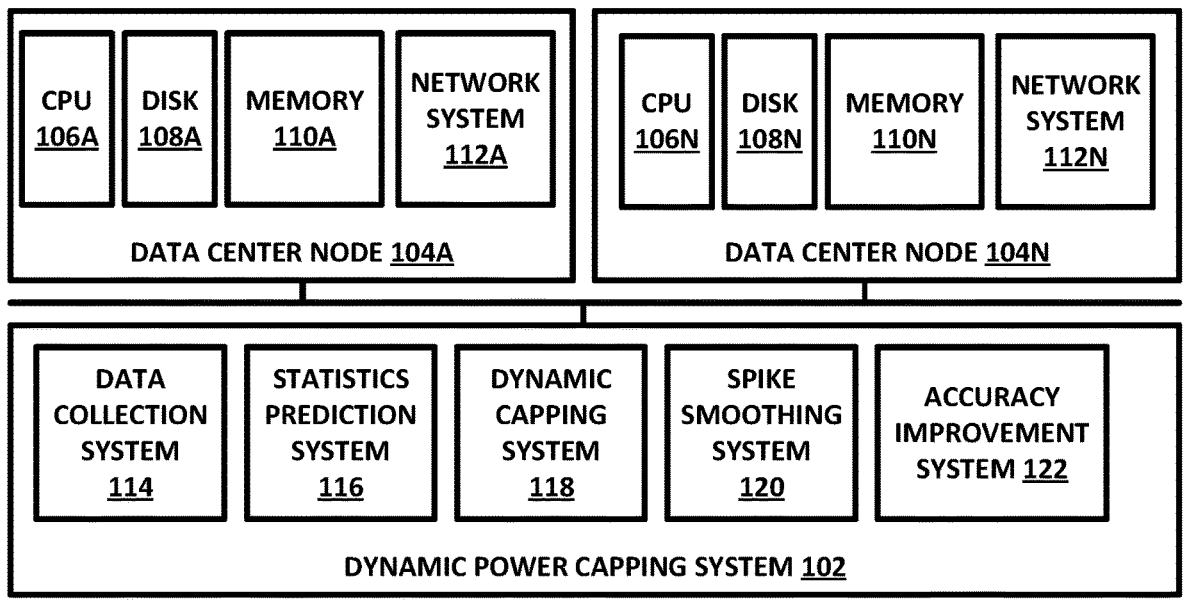
FIG. 1 is a diagram of a system for providing a dynamic adaptive power capping setting workflow, in accordance with an example embodiment of the present disclosure.

In the description that follows, like parts are marked throughout the specification and drawings with the same reference numerals. The drawing figures may be to scale and certain components can be shown in generalized or schematic form and identified by commercial designations in the interest of clarity and conciseness.

In data center computer systems, or "nodes," power and thermal management policies are usually static and set manually by intuitive processes. However, in virtualized cluster environments with policy driven workload balancing, the virtual machines (VMs) that operate on the data center nodes are dynamically migrated across the systems (clusters of nodes) based on the set cluster management policies. In this configuration, the power policies are not being set at the cluster level. As a result, the power policies are generally mismatched with power requirements, because there is no intelligence available regarding the runtime migration of workloads. This condition can result in an "overfit," or an unnecessary loss of power, or an "underfit," where available resources are unable to support the workload, resulting in undesired migration of workloads.

If power policies are set statically across entire cluster devices, that condition can result in over- or under-fitting across hundreds of cluster devices in a typical data center. This condition can thus result in loss of revenue, because electricity cost is one of the highest operational expenditures incurred in running a datacenter.

Intelligent systems can implement automatic changes in power capping based on compute load level changes, but they do so in real time. This process requires continuous monitoring of the resource utilization, and can end up causing too many power capping changes if the resource utilization is fluctuating around the change level.

The present disclosure provides a system and method for dynamic power capping based on multivariate time series forecasting of cluster device load. The disclosed system and method can automatically set the power capping value according to the a-priori predicted 'future' load, can perform a continuous accuracy determination using a relative deviation and an autonomous adjustment map, and can provide other advantages, as discussed herein. The present disclosure can also prevent excessive revision of power capping values, by removing power usage data values that exceed a predetermined amount, which may be referred to as single point spikes or "spikes." The present disclosure further provides for continuous improvement and accuracy based autonomous setting of power capping values, to ensure that devices pull the optimal required power at any given point in time.

The present disclosure correlates a compute load to a power consumption that is required for that compute load. Because power consumption is proportional to the processor load, power consumption by a cluster node increases as the load on the processor(s) of the node increases, and decreases as the load on the processor(s) decreases. The system and algorithm of the present disclosure predicts the processor load on the cluster systems, identifies the relative power consumption and derives a dynamic approach to accurately mapping power capping accordingly. In one example embodiment, these processes can be performed by data collection, predicting ahead cluster node statistics at "n" time steps in the future (where "n" is a positive, non-zero integer), by dynamic capping of power value for transition time instances, by smoothening single point spikes to avoid frequent power capping changes, by continuous accuracy improvement using capping adjustment mechanism, and as otherwise disclosed and discussed further herein.

In regards to data collection, data specific to system usage parameters from each of the cluster nodes can be gathered using telemetry, such as by polling system components, by receiving periodic reports from system components or in other suitable manners. The parameters that are measured can include CPU load as a percentage of maximum load, disk input-output load as a percentage of maximum capacity, memory usage as a percentage of maximum memory usage and network communication system usage as a percentage of maximum usage, as well as other suitable data. The gathered data can be translated to time series data and used as inputs for an n-step ahead forecast engine.

In regards to predicting n-step ahead cluster node statistics, after the system information is collected as a historical data set, such as in a Probabilistic Weighted Fuzzy Time Series (PWFTS), over a period for each component (such as the CPU, memory, disk I/O and network system or other suitable system components), the next "n" steps ahead are predicted, where "n" can be selected based on optimization, provided by a user or otherwise suitable provided. An example of a table of PWFTS multivariate time series is shown below:

| Step No. | Time stamp (epoch) | CPU Busy % | Disk IO % | Memory % | Network % |
|---|---|---|---|---|---|
| 1 | 1546292100 | 33.79873 | 21 | 48 | 26 |
| 2 | 1546292400 | 35.43446 | 24 | 52 | 33 |
| ... | ... | ... | ... | ... | ... |
| 285 | 1546377000 | 37.65735 | 28 | 57 | 12 |

An example of computed future step data is shown below:

| Step No. | Time (epoch) | Compute Busy % |
|---|---|---|
| 1 | 1550791232 | 39.79873 |
| 2 | 1550859835 | 41.43446 |
| ... | ... | ... |
| 285 | 1578695422 | 47.65735 |

In regards to dynamic capping of power values for transition time instances, most of the current processor node systems allow for the power capping value to be fixed manually. Once fixed, that level can be inefficient or otherwise counter-productive if the resource utilization changes considerably and the power capping value is not updated in response. If the power capping level was relaxed by a pre-defined percentage when the load on the cluster device was heavy, such as to allow power resources to be available accordingly, then if the cluster device compute utilization comes down later, but the power capping value was not updated, the system will be operating with a higher power usage setting, even though there is no specific need for higher power. Similarly, when the power cap is restricted by a pre-defined percentage, but there is a rise in the workload requirements, then the power cap setting can result in an inability to meet the compute requirements.

The present disclosure automates the setting of the power cap while also addressing the above-mentioned problems. Using the PWFTS prediction of resource utilization, it can be determined beforehand at which time instances the resource usage may change considerably. In one example embodiment, three usage levels can be defined based on which a power capping change decision can be made—Low, Medium and High:

$K=\{k: k \in 1, 2, 3\}$ respectively

More levels can also or alternatively be defined, depending on desired granularity and the boundaries may be altered. In the present example, mapping for K and a default power capping threshold $Th_K$ for that K against the resource utilization can be provided in a Default Threshold Mapping Table, such as the one shown below, or in other suitable manners:

| Usage Level | Resource Utilization % | K | Default Threshold value to set ($Th_K$) |
|---|---|---|---|
| Low | 0%-30% | 1 | 60% |
| Medium | 30%-60% | 2 | 30% |
| High | 60%-100% | 3 | 0% |

If forecasting is made from $t_0$ onwards with a step $\delta$ in time and i denotes every next instance, then the set of time instances for which the prediction is made is provided by:

$T=\{t_i : i \in W\}$

From the prediction, the transition points can be obtained along with their transitioned level referring to the points where resource utilization moves from one usage level to the other. This transition of level can be shown as:

$k \rightarrow k_{new} | k_{new} \in \{K-k\}$

A transition data set that includes the time of change and the transitioned levels can be shown as:

$T_{tr}=\{(t_m, k_m) : t_m = t_i | t_i \in T \forall t_{i-1}^k \rightarrow t_i^{k_{new}}, k_m = k_{new}\}$ At these transition time instances, the threshold value can be changed to the default threshold, corresponding to a final usage level to which transition has occurred. Once this setting has been completed, there is no need to measure the resource utilization at every point, which is one of the previously unrecognized problems in autonomous threshold setting.

Figure 3:
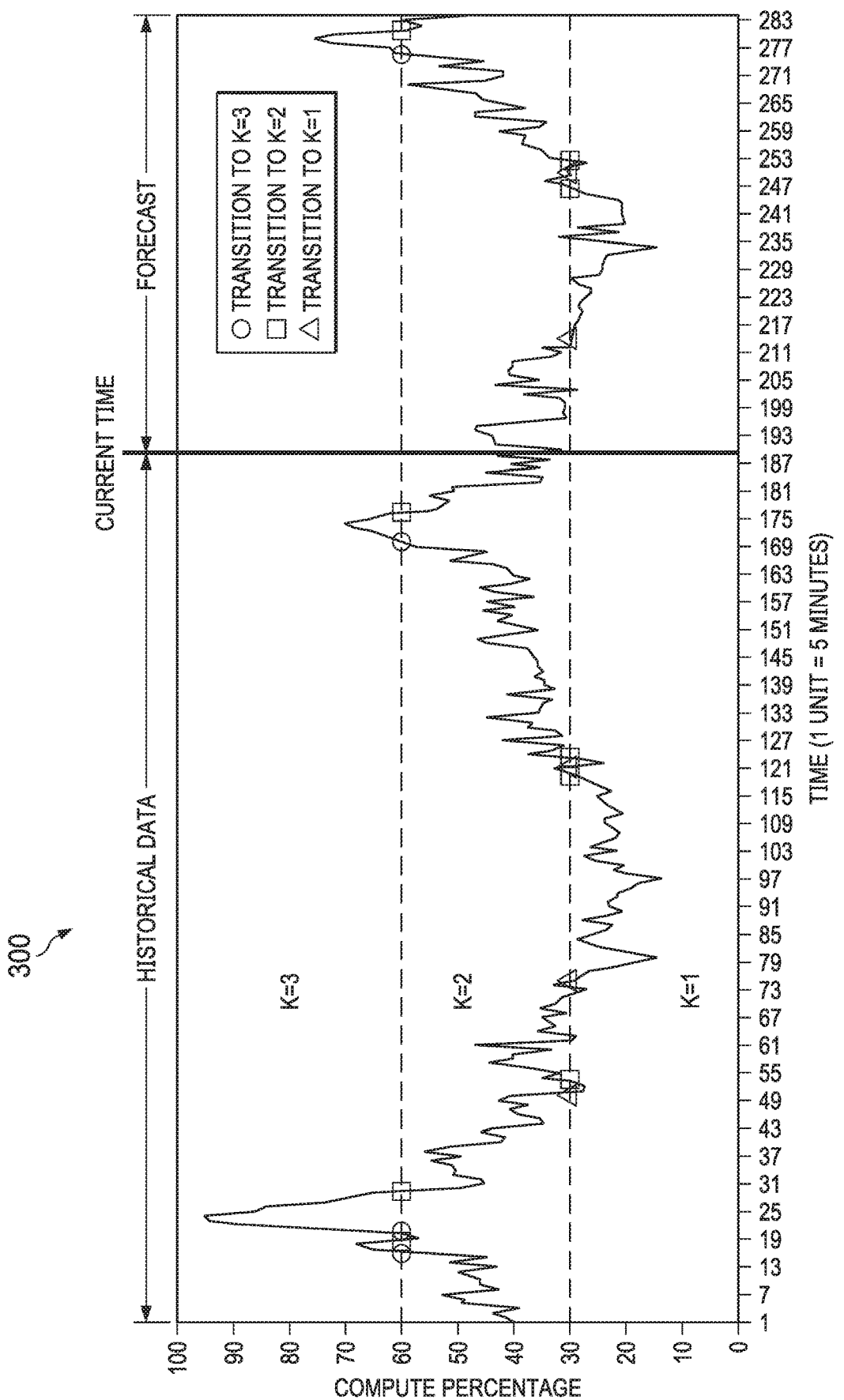
FIG. 3 is a diagram showing an example of power usage tracking and highly variable, "spiky" power usage, with examples of power levels K=1, 2 and 3, in accordance with an example embodiment of the present disclosure.

The present disclosure can also be used for smoothening single point spikes to avoid frequent power capping changes, to resolve the problem of avoiding frequent changes at the juncture of usage levels. This problem can occur if power usage is highly variable or "spiky," and one way to address the problem is to drop single point spikes and/or small groups of "spikes" from the transition set. For a single point spike embodiment, the final transition set can be provided by the following equation:

$T_{tr}=\{(t_m, k_m) : t_m \neq t_i | t_i \in T_{tr} \forall t_{i-1}^k = t_{i+1}^k, k_m = k_{new}\}$ FIG. 3 is a diagram 300 showing an example of power usage tracking and highly variable, "spiky" power usage, with examples of power levels K=1, 2 and 3, in accordance with an example embodiment of the present disclosure. As can be seen, by eliminating the effect of power excursions having a duration equal to or less than a predetermined excursion time, it is possible to set the power usage level to avoid excessive power usage when there is only a temporary need for such higher power levels.

The present disclosure also provides for continuous accuracy improvement using a capping adjustment mechanism. As discussed above, good results are obtained when the prediction of resource utilization is accurate. As the training size increases, the forecasting algorithm provides results closer to the reality. However, in case of a smaller training set, or when there is a workload change in the system, the predicted power levels can excessively deviate from actual utilization. In such cases, the threshold value can be dynamically altered to avoid over- or under-power capping, by using a continuous threshold adjustment mechanism.

For continuous threshold adjustment, real time observations ($R_a$) are made after every time step j such that j={ni: n∈N−1} where n is the monitoring frequency factor. It should be noted here that n should be greater than 1 to avoid annulling the prediction benefits, and instead making too many measurements. The actual measure at time instance $t=t_i$ can be denoted with $R_a^{t_i}$ and the predicted value for the same time instance as $R_p^{t_i}$.

The deviation Δ between the actual resource utilization $R_a$ and the predicted value $R_p$ can be monitored after every nδ time units and compared with a predefined tolerance ε, which denotes the relative deviation that can be tolerated. In this example embodiment, the relative deviation increases beyond ε in magnitude. A change $\Delta_{Th}$ can be made in the present threshold value (Th) according to a Threshold Adjustment Mapping Table, such as:

| Present Threshold Value (Th) | Change in Threshold Value ($\Delta_{Th}$) |
|---|---|
| 0%–30% | 10% |
| 30%–70% | 05% |
| 70%–90% | 02% |
| 90%–99% | 01% |

An example of pseudocode for an adaptive threshold mechanism with continuous adjustment and accuracy improvement is provided below, but other suitable algorithms can also or alternatively be used.

```
INPUT:      n-step ahead time series data
OUTPUT:     adaptive threshold (Th)
initially:  i = 0,  Set threshold value corresponding to K at t_0
            Th = Th_K at t_{i=0} where Th_K = Th : t_{i=0} → K
Set i = 1, j = ni
while i > 0
if t_i = t_{ni} , then
    Th = Th_K where Th_K = Th : t_i → K → Th
else
    continue
if i = j , then Calculate relative deviation
```
$$\Delta^{t_j} = \frac{R_a^{t_j} - R_p^{t_j}}{R_a^{t_j}}$$
```
    if Δ^{tj} > ε , then
        Th = Th_K + Δ_{Th}
    else if Δ^{tj} < − ε , then
        Th = Th_K − Δ_{Th}
j = j + n
else
    continue
i = i + i
```

The time complexity of proposed method can be summarized as follows:

| Multivariate PWFTS | O(n log n) |
|---|---|
| Adaptive threshold with continuous accuracy evaluation | O(n) |

The present disclosure provides a system and method for intelligent and predictive optimization of the device power needs, by continuous improvement and accuracy based autonomous setting of the power capping value. The system and method of the present disclosure ensures that devices are provided with the optimal required power at any given point in time. Currently available solutions can provide some power savings across virtualized cluster devices, such as by bringing down a few hosts during low resource periods, such solutions still result in the powered-on cluster devices pulling the maximum static amount of power. The present disclosure provides a substantial improvement over such prior solutions, by allowing multiple powered-on cluster devices to be dynamically assigned a different required amount of power and for that power level to be changed.

It is further noted that in such prior art solutions, the VMs must be migrated onto the powered-on cluster devices from a state in which the devices are powered-off. Similarly, if there is an increase in workload, the powered-off cluster devices are powered-on and the VMs are migrated across the powered-on devices to balance the load. For both scale down and scale-up powering in case of such prior art systems, migration of VMs is involved, which is resource and performance intensive, and which requires substantial processing, to migrate VMs across the cluster devices. The present disclosure avoids such unnecessary migration of VMs across cluster devices by adjusting power levels instead.

The present disclosure thus provides a single variable for resource prediction, multivariate time series, manual power capping setting (intuitive), adaptive power capping, continuous accuracy improvement, minimization of too many frequent power capping changes, real-time resource allocation, a-priori resource allocation (based on prediction), autonomous dynamic resource setting based on forecasted a-priori resource utilization, a multivariate approach for PWFTS (e.g. CPU idle %, Disk I/O, Network and Memory) that can be used for forecasting compute resource with a time complexity of O(n), dynamic power capping with adaptive compute change rate detection and correction, and reduction of too many frequent power capping changes by smoothening single point spikes, as well as other features and advantages as discussed herein.

FIG. 1 is a diagram of a system 100 for providing a dynamic adaptive power capping setting workflow, in accordance with an example embodiment of the present disclosure. System 100 includes dynamic power capping system 102, which further includes data collection system 114, statistics prediction system 116, dynamic capping system 118, spike smoothing system 120 and accuracy improvement system 122, and data center nodes 104A-104N, which include CPU 106A-106N, disk 108A-108N, memory 110A-110N and network system 112A-112N, respectively, and which can be implemented in hardware or a suitable combination of hardware and software.

Dynamic power capping system 102 can be implemented as one or more algorithms that are installed on a processor and which cause the processor to perform the functions of monitoring data center nodes 104A-104N and their associated system components and dynamically adjusting the individual power caps for each node based on individual and system power levels. In one example embodiment, dynamic power capping system 102 can monitor power consumption by each of data center nodes 104A-104N and their associated system components and can exclude outlier "spikes" from determination of power cap levels, to allow power cap levels to be dynamically adjusted to optimize the number of virtual machines that are transferred between nodes, and for other suitable purposes.

Data collection system 114 can be implemented as one or more algorithms that are installed on a processor and which cause the processor to perform the functions of compiling power update statistics for data center nodes 104A-104N and their associated system components. In one example embodiment, data collection system 114 can periodically poll data center nodes 104A-104N and their associated system components, can receive status data from data center nodes 104A-104N and their associated system components or can perform other suitable functions.

Statistics prediction system 116 can be implemented as one or more algorithms that are installed on a processor and which cause the processor to perform the functions of predicting a number of future power level steps as a function of prior power level steps. In one example embodiment, the values for the future steps can be based on the power levels at the immediately preceding steps, historical data and other suitable data as discussed herein.

Dynamic capping system 118 can be implemented as one or more algorithms that are installed on a processor and which cause the processor to perform the functions of adjusting power level caps for each of data center nodes 104A-104N. In one example embodiment, a data center node can have power level caps that are based on a range of power levels, such as to ensure that the virtual machines that are being hosted at each data center node have sufficient power but to avoid excessive power level settings that result in wasted power consumption.

Spike smoothing system 120 can be implemented as one or more algorithms that are installed on a processor and which cause the processor to perform the functions of identifying outlier single point spikes from power consumption data and omitting the "spikes" from calculations for power level settings, as discussed further herein.

Accuracy improvement system 122 can be implemented as one or more algorithms that are installed on a processor and which cause the processor to perform the functions of comparing predicted power levels to actual power levels to determine whether additional evaluation of power level settings is required, as discussed further herein.

Data center nodes 104A-104N can include CPU 106A-106N, disk 108A-108N, memory 110A-110N and network system 112A-112N, respectively, and can provide dynamic support for a plurality of virtual machines. The power consumption for each component of data center nodes 104A-104N and their associated system components can be provided in response to a poll, can be periodically transmitted or other suitable functions can also or alternatively be performed.

In operation, system 100 allows the power cap levels at data center nodes 104A-104N to be dynamically adjusted to improve the power efficiency of system 100. In this manner, each data center node 104A-104N can be provided with dynamic power cap levels that optimize power consumption, and that provide other noted benefits.

Figure 2:
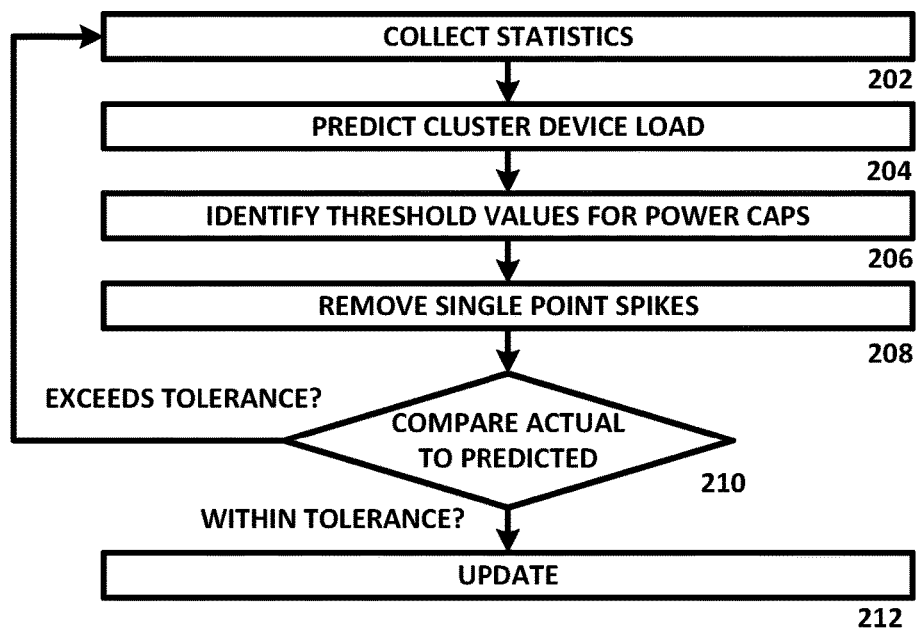
FIG. 2 is a diagram of an algorithm for providing a dynamic adaptive power capping setting workflow, in accordance with an example embodiment of the present disclosure.

FIG. 2 is a diagram of an algorithm 200 for providing a dynamic adaptive power capping setting workflow, in accordance with an example embodiment of the present disclosure. Algorithm 200 can be implemented in hardware or a suitable combination of hardware and software.

Algorithm 200 starts at 202, where statistics for power usage at a plurality of nodes are collected. In one example embodiment, the statistics can be collected by using a processor to send a poll data message over a network to each node to provide power usage data and by monitoring poll responses, by receiving a periodic power usage update message over the network from each node at the processor and by storing the update in a database, or in other suitable manners. The algorithm then proceeds to 204.

At 204, cluster device loads are predicted. In one example embodiment, the cluster device load predictions can be generated by a processor that uses a prior cluster device loads at preceding time steps and which generates a prediction based on a trend analysis, can be based on a historical analysis of cluster device loads by a processor, or can be implemented in other suitable manners. The algorithm then proceeds to 206.

At 206, threshold values for power caps are identified. In one example embodiment, the threshold values for power caps can be identified by a processor that processes a series of power usage data values to identify a power cap that will not be exceeded by a predetermined number of "spikes," or in other suitable manners. The algorithm then proceeds to 208.

At 208, "spikes" are removed from the set of data that is used to determine threshold values for power caps, such as by using a processor. In one example embodiment, the criteria for classifying a power usage reading as a "spike" can be based on a predetermined relationship of the power usage reading to preceding power usage readings, a predetermined relationship of the power usage reading to the power cap or other suitable data. The algorithm then proceeds to 210.

At 210, the actual power usage is compared to the predicted power usage, to determine whether the difference falls within a predetermined tolerance. In one example embodiment, a processor can compare the actual power usage to the predicted power usage and determine whether the tolerance is exceeded, or other suitable processes can also or alternatively be used. If it is determined that the actual power usage does not exceed the predicted power usage by the tolerance, the algorithm proceeds to 212, otherwise the algorithm returns to 202.

At 212, the power caps are updated, and the process terminates. In one example embodiment, the process can be repeated at predetermined times, after a predetermined number of time increments, or in other suitable manners.

In operation, algorithm 200 allows dynamic adaptive power cap setting to be implemented, such as in a system that includes a large number of data center nodes or for other suitable embodiments. Although algorithm 200 is shown as a flow chart, a person of skill in the art will recognize based on the present disclosure that it can also or alternatively be implemented as a state diagram, a ladder diagram, using object-oriented programming or in other suitable manners.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes one or more microcomputers or other suitable data processing units, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. The term "data" can refer to a suitable structure for using, conveying or storing data, such as a data field, a data buffer, a data message having the data value and sender/receiver address data, a control message having the data value and one or more operators that cause the receiving system or component to perform a function using the data, or other suitable hardware or software components for the electronic processing of data.

In general, a software system is a system that operates on a processor to perform predetermined functions in response to predetermined data fields. A software system is typically created as an algorithmic source code by a human programmer, and the source code algorithm is then compiled into a machine language algorithm with the source code algorithm functions, and linked to the specific input/output devices, dynamic link libraries and other specific hardware and software components of a processor, which converts the processor from a general purpose processor into a specific purpose processor. This well-known process for implementing an algorithm using a processor should require no explanation for one of even rudimentary skill in the art. For example, a system can be defined by the function it performs and the data fields that it performs the function on. As used herein, a NAME system, where NAME is typically the name of the general function that is performed by the system, refers to a software system that is configured to operate on a processor and to perform the disclosed function on the disclosed data fields. A system can receive one or more data inputs, such as data fields, user-entered data, control data in response to a user prompt or other suitable data, and can determine an action to take based on an algorithm, such as to proceed to a next algorithmic step if data is received, to repeat a prompt if data is not received, to perform a mathematical operation on two data fields, to sort or display data fields or to perform other suitable well-known algorithmic functions. Unless a specific algorithm is disclosed, then any suitable algorithm that would be known to one of skill in the art for performing the function using the associated data fields is contemplated as falling within the scope of the disclosure. For example, a message system that generates a message that includes a sender address field, a recipient address field and a message field would encompass software operating on a processor that can obtain the sender address field, recipient address field and message field from a suitable system or device of the processor, such as a buffer device or buffer system, can assemble the sender address field, recipient address field and message field into a suitable electronic message format (such as an electronic mail message, a TCP/IP message or any other suitable message format that has a sender address field, a recipient address field and message field), and can transmit the electronic message using electronic messaging systems and devices of the processor over a communications medium, such as a network. One of ordinary skill in the art would be able to provide the specific coding for a specific application based on the foregoing disclosure, which is intended to set forth exemplary embodiments of the present disclosure, and not to provide a tutorial for someone having less than ordinary skill in the art, such as someone who is unfamiliar with programming or processors in a suitable programming language. A specific algorithm for performing a function can be provided in a flow chart form or in other suitable formats, where the data fields and associated functions can be set forth in an exemplary order of operations, where the order can be rearranged as suitable and is not intended to be limiting unless explicitly stated to be limiting.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A system for data processing, comprising:
    a plurality of data center nodes, each data center node having an associated power requirement and a plurality of virtual machines;
    a dynamic power capping system operating on a processor and coupled to the plurality of data center nodes, wherein the processor is configured by the dynamic power capping system to implement one or more algorithms that cause the processor to determine a power requirement for each of the plurality of data center nodes that excludes outlier spikes from determination of power cap levels and to implement a power setting at each of the plurality of data center nodes that corresponds to the power requirement for the data center node to optimize a number of virtual machines that are transferred between the data center nodes.

2. The system of claim 1 wherein the power setting at each of the plurality data center nodes comprises a plurality of different power settings.

3. The system of claim 1 wherein the dynamic power capping system is configured to monitor the power requirement at each data center node over time.

4. The system of claim 3 wherein the dynamic power capping system is configured to identify a power excursion that exceeds a predetermined level for a short period of time and to omit the power excursion from the adjusted power setting as a function of a virtual machine power requirement.

5. The system of claim 1 wherein the dynamic power capping system further comprises a data collection system operating on the processor, wherein the processor is configured by the data collection system to implement one or more algorithms that cause the processor to transmit a poll to each of a plurality of data center nodes.

6. The system of claim 1 wherein the dynamic power capping system further comprises a statistics prediction system operating on the processor, wherein the processor is configured by the statistics prediction system to implement one or more algorithms that cause the processor to process a plurality of energy poll data sets and to generate a predicted energy usage at one or more future times.

7. The system of claim 1 wherein the dynamic power capping system further comprises a dynamic capping system operating on the processor, wherein the processor is configured by the dynamic capping system to implement one or more algorithms that cause the processor to exclude one or more energy poll data sets from a power cap calculation.

8. The system of claim 1 wherein the dynamic power capping system further comprises a spike smoothing system operating on the processor, wherein the processor is configured by the spike smoothing system to implement one or more algorithms that cause the processor to process a plurality of energy poll data sets to generate a power setting level.

9. The system of claim 1 wherein the dynamic power capping system further comprises an accuracy improvement system operating on the processor, wherein the processor is configured by the accuracy improvement system to implement one or more algorithms that cause the processor to compare a predicted power usage to an actual power usage and to modify a power setting when a difference between the predicted power usage and the actual power usage is outside of a tolerance.

10. A method for data processing, comprising:
assigning a power setting at each of a plurality of data center node clusters;
determining a modified power requirement for each of the plurality of data center node clusters using one or more algorithms on a processor as a function of power usage data that excludes outlier spikes from determination of power cap levels; and
modifying the power setting for each of the plurality of data center node clusters as a function of the modified power requirement to optimize a number of virtual machines that are transferred between the data center nodes.

11. The method of claim 10 wherein the power setting at each of the plurality data center node clusters comprises a plurality of different power settings.

12. The method of claim 10 further comprising:
monitoring the power requirement at each data center node cluster over time using the processor; and
adjusting the power setting as a function of a change in power requirements over time using the processor.

13. The method of claim 12 further comprising;
identifying a power excursion that exceeds a predetermined level for a short period of time; and
omitting the power excursion from the adjusted power setting.

14. The method of claim 10 further comprising:
transmitting a poll to each of a plurality of data center node clusters using the processor.

15. The method of claim 10 further comprising:
processing a plurality of energy poll data sets using the processor; and
generating a predicted energy usage at one or more future times as a function of the processed energy poll data sets using the processor and a number of virtual machines operating at one or more node clusters.

16. The method of claim 15 further comprising:
excluding one or more energy poll data sets from a power cap calculation using the processor as a function of predetermined exclusion characteristics.

17. The method of claim 10 further comprising:
process a plurality of energy poll data sets using the processor; and
generating a power setting level using the processor as a function of the processed energy poll data sets.

18. The method of claim 10 further comprising:
comparing a predicted power usage to an actual power usage using the processor; and
modifying a power setting using the processor when a difference between the predicted power usage and the actual power usage is outside of a tolerance.

19. A method for data processing, comprising:
assigning a power setting at each of a plurality of data center nodes;
determining power usage data that excludes outlier spikes;
determining a modified power cap level for each of the plurality of data center nodes using one or more algorithms on a processor as a function of the power usage data; and
modifying the power setting for each of the plurality of data center nodes as a function of the modified power requirement to optimize a number of virtual machines transferred between nodes.

20. The method of claim 19 wherein modifying the power setting for each of the plurality of data center nodes as the function of the modified power requirement and the number of virtual machines operating on each node comprises modifying the power setting for each of the plurality of data center nodes as the function of the modified power requirement and a number of transferred virtual machines.

* * * * *